United States Patent
Hardin (10) Patent No.: US 10,724,628 B2
(45) Date of Patent: Jul. 28, 2020

(54) METHODS AND SYSTEMS FOR IMPROVING THE OPERATION OF TRANSMISSIONS FOR MOTOR VEHICLES

(71) Applicant: David A. Hardin, El Monte, CA (US)

(72) Inventor: David A. Hardin, El Monte, CA (US)

(73) Assignee: Transgo, LLC, El Monte, CA (US)

( * ) Notice: Subject to any disclaimer, the term of this patent is extended or adjusted under 35 U.S.C. 154(b) by 186 days.

(21) Appl. No.: 16/018,344

(22) Filed: Jun. 26, 2018

(65) Prior Publication Data

US 2019/0003576 A1  Jan. 3, 2019

Related U.S. Application Data

(60) Provisional application No. 62/526,579, filed on Jun. 29, 2017.

(51) Int. Cl.
*F16H 61/00* (2006.01)
*F16H 61/02* (2006.01)

(52) U.S. Cl.
CPC ......... *F16H 61/00* (2013.01); *F16H 61/0009* (2013.01); *F16H 61/0206* (2013.01); *F16H 2061/0062* (2013.01)

(58) Field of Classification Search
None
See application file for complete search history.

(56) References Cited

U.S. PATENT DOCUMENTS

| | | | |
|---|---|---|---|
| 4,449,426 A | 5/1984 | Younger | |
| 4,711,140 A | 12/1987 | Younger | |
| 4,790,938 A | 12/1988 | Younger | |
| 5,157,608 A * | 10/1992 | Sankpal | F16H 61/0021 477/155 |
| 5,253,549 A | 10/1993 | Younger | |
| 5,540,628 A | 7/1996 | Younger | |
| 5,624,342 A | 4/1997 | Younger | |
| 5,730,685 A | 3/1998 | Younger | |
| 5,743,823 A | 4/1998 | Younger | |
| 5,768,953 A | 6/1998 | Younger | |
| 5,820,507 A | 10/1998 | Younger | |
| 5,967,928 A | 10/1999 | Younger | |
| 6,099,429 A | 8/2000 | Younger | |
| 6,117,047 A | 9/2000 | Younger | |

(Continued)

*Primary Examiner* — Justin Holmes
(74) *Attorney, Agent, or Firm* — Mark P. Stone (57) ABSTRACT

A method for modifying the hydraulic circuitry of factory installed 46RE, 47RE and 48 RE automotive transmissions internally re-routes the flow of hydraulic fluid within the valve body of the automotive transmission to improve the overall operation of these factory installed automotive transmissions, without adding or installing any external passageway structures to the valve body. The internal re-routing of the hydraulic flow within the valve body is accomplished by replacing the existing separator plate with one or more new cooperating separator plates, and by plugging portions of the existing hydraulic circuitry, to internally re-route the flow of hydraulic fluid within the valve body by blocking certain existing internal hydraulic circuitry and by creating new internal hydraulic circuitry for fluid flow within the valve body. The modified 46RE and 47RE transmissions exhibit improved operating characteristics, simulating the operation of a 48RE automotive transmission.

15 Claims, 9 Drawing Sheets

(56) References Cited

U.S. PATENT DOCUMENTS

| | | |
|---|---|---|
| 6,287,231 B1 | 9/2001 | Younger |
| 6,390,944 B1 | 5/2002 | Younger |
| 6,474,456 B2 * | 11/2002 | Suzuki ............... F16H 61/0009 137/269 |
| 6,565,472 B1 | 5/2003 | Younger |
| 6,699,157 B2 | 3/2004 | Younger |
| 6,729,989 B2 | 5/2004 | Younger |
| 6,814,680 B2 | 11/2004 | Younger |
| 6,871,397 B2 | 3/2005 | Younger |
| 6,913,554 B2 | 7/2005 | Younger |
| 6,964,628 B2 | 11/2005 | Younger |
| 7,128,679 B2 | 10/2006 | Younger |
| 7,331,893 B2 | 2/2008 | Younger |
| 9,429,228 B2 | 8/2016 | Younger |
| 9,970,534 B2 | 5/2018 | Younger |
| 2016/0252178 A1 | 9/2016 | Dial et al. |

* cited by examiner

METHODS AND SYSTEMS FOR IMPROVING THE OPERATION OF TRANSMISSIONS FOR MOTOR VEHICLES

The present patent application claims the benefit of U.S. Provisional Patent Application No. 62/526,579, filed on Jun. 29, 2017.

BACKGROUND OF THE INVENTION

The methods and systems of the present invention are directed to the modification and improvement of transmissions for automotive vehicles, more commonly referred to as "factory installed" transmissions, installed in automotive vehicles by an original motor vehicle manufacturer. The invention is more particularly directed to improvements to the Daimler Chrysler 46RE, 47RE and 48RE "factory installed" transmissions, and also to the conversion of the Daimler Chrysler 46RE and 47RE "factory installed" transmissions into a transmission functionally equivalent to a "factory installed" Daimler Chrysler 48RE automotive transmission.

The following publication, identified as "CHRYSLER CORPORATION-SERVICE MANUAL, 1997, RAM TRUCK, 1500-3500", Copyright 1996, which is the operating manuals for the "factory installed" Daimler Chrysler 46RE and 47RE automotive transmissions, is expressly incorporated by reference herein.

The methods and systems of the present invention were developed to substantially upgrade original equipment pressure control systems in 46RE and 47RE transmissions to simulate the operation of a 48RE transmission having a more flexible, targeted, higher capacity system while maintaining a uniform balance in pressure for all ranges thus eliminating pressure extremes and deficiencies commonly found in systems with increases to the regulator spring force alone. The methods and systems also provide improvements to the operation of the "factory installed" 48RE automotive transmission.

The need for a system modified in accordance with the present invention arises from the wide range of variables in horsepower and torque, applied to the additional variable of "total load" that the vehicle either carries or pulls while towing. This requires more balance in pressure values for the requirements of each gear selected including Reverse. A simple spring rate change to the main pressure regulator cannot provide the level of control and pressure balance needed to cover all of these variables. For example, raising spring rate alone creates the undesirable side effect of generating too much pressure in 4th and TCC while in boost in order to fix the need for more pressure in 1st through 3rd while out of boost. This same imbalance or lopsided pressure scheme also creates excessive pressure in Reverse, thus stressing the Reverse band, struts and servo piston as well as components in the direct drum. This same lopsided pressure scheme makes it difficult or impossible to adjust between vehicles with 50 hp increases towing 7500 lbs verses vehicles with 250 hp increases towing 13,000 lbs while still maintaining a satisfactory comfort level in drivability for each vehicle. A better solution was needed for the 46RE, 47RE and 48RE's than the factory style tube supplied split boost system without resorting to an overly expensive and/or time consuming solution.

The methods and systems of the present invention utilize a whole new way of using the existing pressure control system, by abandoning some of the existing system and creating new circuits to broaden the capacity and the balance of the original pressure system. These modifications to the existing pressure control system of the factory installed transmissions, combined with optional features for all models of the 46RE, 47RE, and 48RE automotive transmissions, creates a new level of precision pressure control to cover all variables of power and load plus provide additional options for Lockup and 4th gear control if desired.

Thus, it is the primary object of the present invention to modify the Daimler Chrysler "factory installed" 46RE, 47RE, and 48RE automotive transmission to improve the overall operation and efficiency of these "factory installed" automotive transmissions. The modifications to the "factory installed" transmissions, as more fully described herein, include replacing the existing separator plate with one or more cooperating new separator plates, preferably three new separator plates, to modify the internal hydraulic circuitry and to internally re-route the flow of hydraulic fluid within the hydraulic circuitry of the valve body of the transmission, as well as blocking of certain existing hydraulic circuitry in the "factory installed" transmission, to modify the internal flow of hydraulic fluid within the valve body.

It is a further object of the present invention to modify the Daimler Chrysler "factory installed" 46RE and 47RE automotive transmissions to result in a transmission that is functionally equivalent to the Daimler Chrysler "factory installed" 48RE automotive transmission by replacing the existing separator plate with one or more cooperating new separator plates, preferably three new separator plates, to modify the existing internal hydraulic circuitry and to internally re-route the flow of hydraulic fluid within the hydraulic circuitry of the valve body of the transmission, as well as blocking of existing hydraulic circuitry, to modify the internal flow of hydraulic fluid within the valve body, without adding any external fluid flow passageways to the valve body of the transmission.

The aforementioned modifications to the Daimler Chrysler "factory installed" 46RE and 47RE automotive transmissions are accomplished internally by modifying the existing hydraulic circuitry, and not by installing external structure such as tubes, conduits, or other external passageways for modifying hydraulic fluid flow within the automotive transmission.

In this regard, the Dial et al. publication (US 2016/0252178 A1), published on Sep. 1, 2016, discloses a method in which a 46RE and 47RE transmission is modified to simulate the operation of a 48RE transmission. However, the modification is accomplished by blocking existing internal fluid flow passageways, and installing an external passageway, so that the fluid flow necessary for the modification is re-routed exclusively through the newly added external passageway.

Thus, the modifications to the factory installed 46RE and 47RE transmissions are accomplished exclusively through internal modifications to the separator plates of the valve body to internally re-route the flow of hydraulic fluid in the valve body, without the installation of any external fluid flow structure, thereby resulting in significant savings in time, costs, and labor.

Other objects and advantages of the modification to the "factory installed" automotive transmissions in accordance with the present invention will become apparent from the following description in conjunction with the drawings.

SUMMARY OF THE INVENTION

The primary object of the present invention is to modify the hydraulic circuitry of factory installed Daimler Chrysler 46RE, 47RE, and 48RE automotive transmissions by internally re-routing the flow of hydraulic fluid within the valve body to improve the overall operation of these factory installed automotive transmissions, without adding or installing any external passageway structures to the valve body. The internal re-routing of the hydraulic flow within the valve body is accomplished by replacing the existing separator plate with one or more new cooperating separator plates, and by plugging portions of the existing hydraulic circuitry, to internally re-route the flow of hydraulic fluid within the valve body by blocking certain existing internal hydraulic circuitry and by creating new internal hydraulic circuitry for fluid flow within the valve body.

A further object of the present invention is to modify the hydraulic circuitry of factory installed Daimler Chrysler 46RE and 47RE automotive transmissions by internally re-routing the flow of hydraulic fluid within the valve body to result in a transmission which is functionally equivalent to the factory installed Daimler Chrysler 48RE automotive transmission. The internal re-routing of the hydraulic flow within the valve body is accomplished by replacing the existing separator plate with one or more new cooperating separators, and by plugging portions of the existing hydraulic circuitry, to create new internal circuitry within the valve body.

DESCRIPTION OF THE BEST MODES FOR CARRYING OUT THE INVENTION

Figure 1:
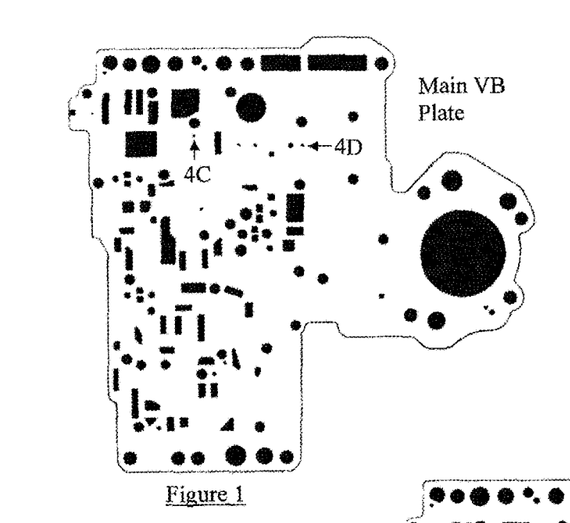
FIGS. 1-3 of the drawing illustrate cooperating separator plates in accordance with the present invention.
Figure 2:
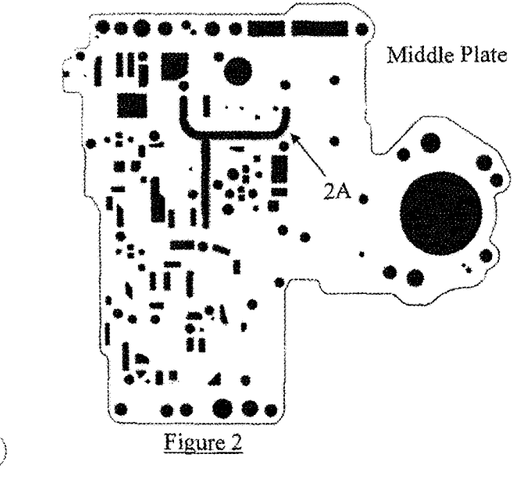
Figure 3:
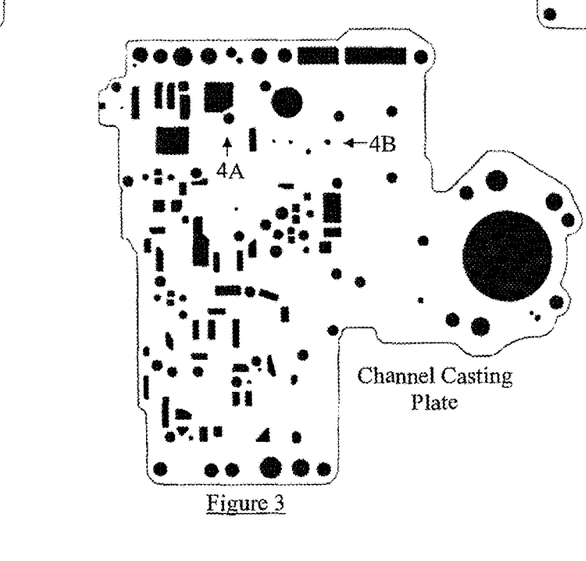

FIGS. 1, 2 and 3 of the drawing illustrate the new parts provided for the expanded pressure system function in accordance with the present invention for modifying the 46RE, 47RE, and 48RE automotive transmissions to improve the operation thereof. The new parts illustrated by FIGS. 1-3 are 3 cooperating new separator plates, to replace the existing separator plate, and are identified as the
1). Main VB (Valve Body) Plate;
2). Middle (Valve Body) Plate; and
3). Channel Casting (Valve Body) Plate The New Main Valve Body Plate contacts the main valve body half and is used to seal top side of the new Middle Plate. This new Main Valve Body Plate has provides no modifications to pressure function and retains the original balance holes shown by the orifices 4C and 4D in FIG. 1.

The New Middle plate contacts the Main plate and is provided to connect Manual Valve Reverse oil to the pressure regulator balance areas ONLY in Reverse. Reference numeral 2 in FIGS. 4 and 5 of the drawing illustrates a new hydraulic circuit created by Middle Plate being sealed between New Main Plate and New Channel Plate. The new slot 2A slot defined in the Middle Plate provides the new path for the Reverse Oil to reach the balance areas in only in Reverse, and is sealed by the New Main and Channel plates from above and below.

Figure 4:
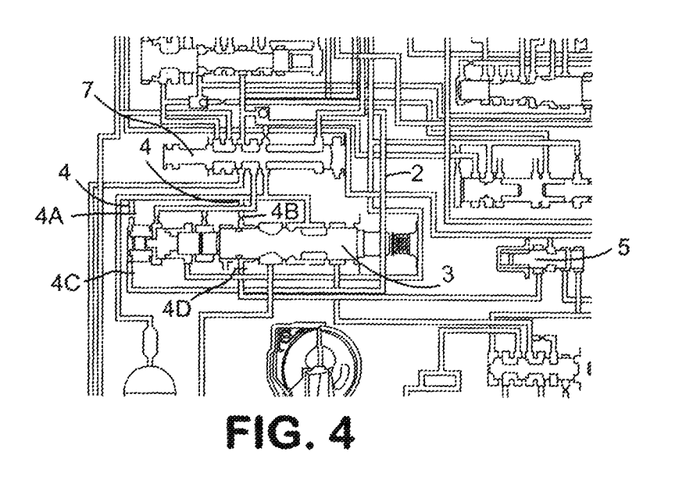
FIGS. 4-5 illustrate modifications of the hydraulic circuitry of the factory installed transmission resulting from the cooperating separator plates illustrated by FIGS. 1-3.
Figure 5:
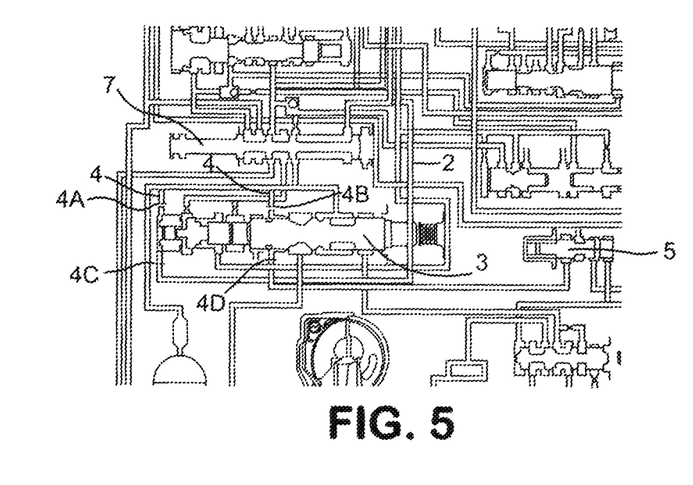

New Channel Plate contacts the New Channel Casting Plate and is provided to seal the bottom side of the New Middle Plate and to block both original balance circuits as illustrated by orifices 4A and 4B and reference numeral 4, representing the blocked factory installed circuit, shown in FIGS. 4 and 5. The arrows illustrated on the New Channel Casting Plate (FIG. 3) show the areas missing the original feed holes. The Main Valve Body Plate (FIG. 1) still has original balance holes formed as orifices 4C and 4D to receive Reverse Only Oil via slot in Middle plate. The remaining original forward balance holes in the Main Plate provide an expanded pressure system due to the missing (blocked) holes in the new Channel Plate.

The "factory installed" transmission includes an hydraulic circuit between the boost valve and the pressure regulator valve, and an hydraulic circuit between the manual valve and the pressure regulator valve, as shown by FIGS. 4 and 5 of the drawing. In the "factory installed" circuit, the manual valve feeds transmission fluid to two balance areas of the pressure regulator valve, namely the left end of the pressure regulator valve and lands defined between the front and rear ends of the pressure regulator valve.

As best illustrated in FIGS. 4 and 5 of the drawing, the new hydraulic circuit 2 is created by removing openings 4A and 4B in the new channel casting plate (FIG. 3), providing the slot 2A in the middle plate (FIG. 2), and providing openings 4C and 4D in the new main valve body plate (FIG. 1). By removing the openings 4A and 4B in the new channel casting plate, the original (factory installed) Forward and Reverse Circuits shown by reference numeral 4 (FIGS. 4 and 5) between the Manual Valve 7 and the balance areas at the left end of the pressure regulator valve 3 and the lands between the front and rear ends of the pressure regulator valve, are blocked at the positions designated by 4A and 4B. The new hydraulic circuit illustrated by reference numeral 2 feeds only Reverse oil directly to the left end of the pressure regulator valve at the area designated by 4C, while the balance lands between the front and rear ends of the pressure regulator valve remain in fluid communication with the boost valve 5 at the area designated by 4D. Thus, the modified hydraulic circuit blocks all fluid flow from the manual valve to the pressure regulator valve, and provides feed of reverse transmission fluid directly to the left end of the pressure regulator valve, bypassing the manual valve, and exhausts both balance areas of the pressure regulator valve in all forward gears.

This modification to the factory installed hydraulic circuitry of the 46RE, 47RE, and 48RE automotive transmissions allows the transmissions to have factory normal Reverse Pressure, while having higher and faster Boost Pressure in 4th gear or TCC when the factory installed boost valve exhausts exhaust both balance circuits. This results in high performance applications for the modified transmissions, increased holding capacity with added horse power and off road capabilities, and increased towing capacity. The modifications also enable also the 46RE and 47RE factory installed automotive transmissions to operate in a manner simulating that of a 48RE automotive transmission.

Figures 6, 7, 8:
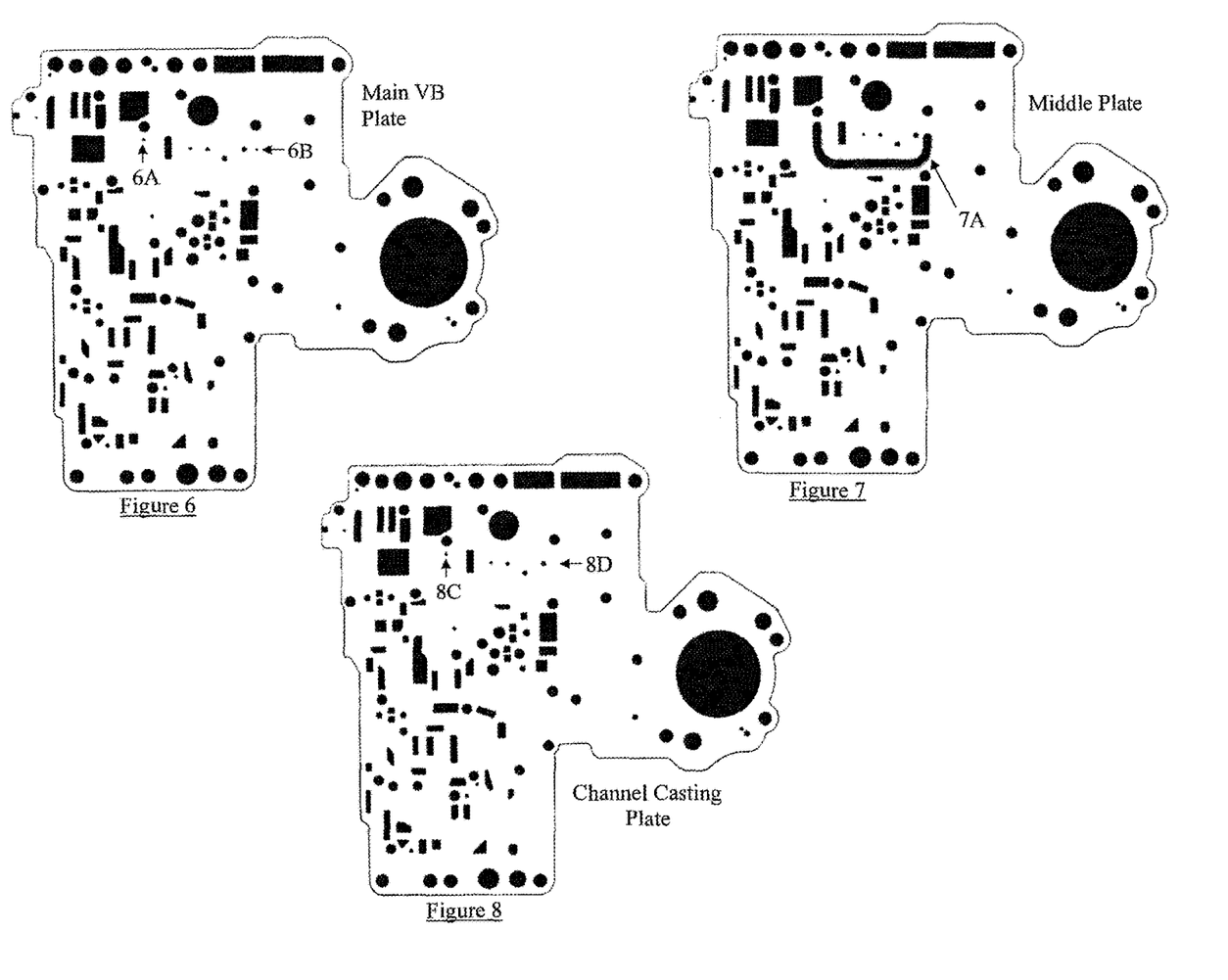
FIGS. 6-8 illustrate further cooperating separator plates in accordance with the present invention.

FIGS. 6, 7, and 8 of the drawing illustrate the new parts provided for converting a 46RE and 47RE factory installed automotive transmissions into an automotive transmission that operates in a manner which is functionally equivalent to the pressure function of a 48RE automotive transmission in accordance with the present invention. The new parts illustrated by FIGS. 5-8 are 3 cooperating new separator plates, to replace the existing separator plate, and are identified as the
1). Main VB (Valve Body) Plate;
2). Middle (Valve Body) Plate; and
3). Channel Casting (Valve Body) Plate The New Main Valve Body Plate contacts the main valve body half and is used to seal top side of the new Middle Plate. This new Main Valve Body Plate has provides no modifications to pressure function and retains the original balance holes (orifices 6A and 6B) shown in FIG. 6.

Figure 9:
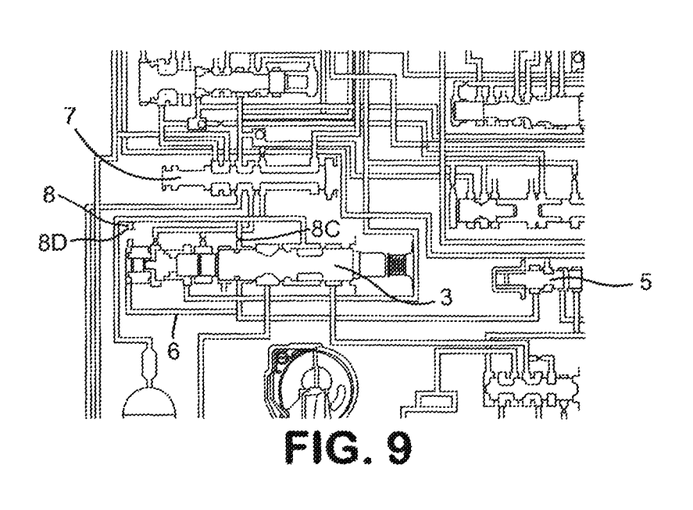
FIGS. 9-10 illustrate modifications of the hydraulic circuitry of the factory installed transmission resulting from the cooperating separator plates illustrated by FIGS. 6-8.
Figure 10:
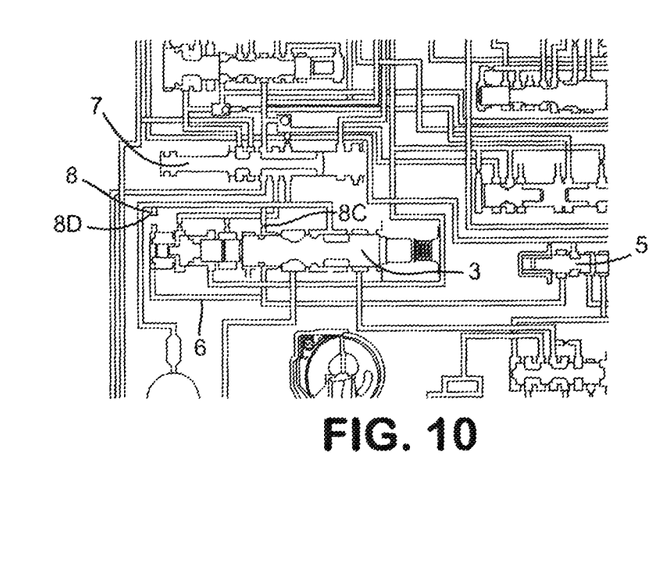

The New Middle Plate (FIG. 7) contacts the New Main plate (FIG. 6) and is provided to add the Reverse pressure regulator balance area to the existing boost valve circuit. Reference numeral 6 in FIGS. 9 and 10 shows the new hydraulic circuit created by a slot 7A (FIG. 7) in the New Middle Plate being sealed between New Main Plate from above and the Channel Plate from below. The slot 7A in the Middle Plate provides a new path for the Reverse Balance Oil to join the forward balance area to reach the boost valve where it will be exhausted during 4th and/or TCC operation, simulating the operation of a 48RE automotive transmission.

The new Channel Plate (FIG. 8) contacts a channel casting and is used to seal the bottom side of the New Middle Plate (FIG. 7) and to block/delete the original (factory installed) Forward and Reverse balance circuit. Reference numeral 8 in FIGS. 9 and 10 as well as the arrows on the Channel Casting Plate (FIG. 8) show the area 8D of the missing original feed opening. The Channel Plate still has an original forward and reverse balance opening 8C to feed line oil to the feed slot 7A in New Middle plate. This arrangement provides both Forward and Reverse Balance in all ranges except during 4th or TCC, simulating the operation of a 48RE automotive transmission.

In the factory installed 46RE and 47RE automotive transmissions, feed openings have line pressure from the Manual Valve in Forward and Reverse and are orificed separately. When the boost valve moves into 4th gear or TCC, pressure feed is exhausted through the opening 8C, resulting in an increase in line pressure and a faster rise ratio based upon the position of the driver's gas pedal.

In the "factory installed" transmission, an hydraulic circuit is provided between the boost valve and the lands between the front and rear ends of the pressure regulator valve, and a further hydraulic circuit is provided between the manual valve and both the left end of the pressure regulator valve and the lands between the front and rear ends of the pressure regulator valve.

As illustrated by FIGS. 9 and 10, the original hydraulic circuit 8 between the manual valve 7 and the left end of the pressure regulator valve 3 is blocked at 8D, so that transmission fluid is fed from the manual valve only to the lands between the front and rear ends of the pressure regulator valve at 8C, but not to the left end of the pressure regulator valve. A new hydraulic circuit 6 is created to extend between a portion of the hydraulic circuit coupling the boost valve 5 to the pressure regulator valve, and the left end of the pressure regulator valve. This new circuit is created by removing opening 8D from the New Channel Plate (FIG. 8), which blocks the original factory installed circuit between the Manual Valve and the left end of the Pressure Regulator Valve as indicated by 8D in FIGS. 9 and 10, and extending the original hydraulic circuit between boost valve and the lands of the pressure regulator valve to also feed fluid to the left end of the pressure regulator valve. (by slot 7A in the new middle plate of FIG. 8), as indicated by reference numeral 6 in FIGS. 9 and 10. The modified hydraulic circuitry now couples the boost valve to both the lands of the pressure regulator valve between the front and rear ends of the pressure regulator valve, provides fluid feed to the left end of the pressure regulator valve by the new hydraulic circuit extending from a portion of the original hydraulic circuit between the boost valve and the pressure regulator valve, and couples the manual valve to only the lands of the pressure regulator valve between the front and rear ends of the pressure regulator valve, but not to the left end of the pressure regulator valve.

The new hydraulic circuit 6 connects the opening 8C to feed the balance area on the Pressure Regulator Valve that was feed by both the blocked circuit 8 (opening 8D) and the opening 8C in the original factory installed transmission. In the modified circuit, when the Boost Valve moves to exhaust the balance area of the Pressure Regulator Valve being feed by opening 8C in 4th gear or TCC, it can exhaust both balance areas 8C and 8D. This allows the modified 46RE or 47RE transmission to boost much higher and faster than the factory installed transmission while in 4th gear or TCC, simulating the operation of a 48RE transmission, while still having normal pressure in reverse gear.

The "factory installed" 46RE & 47RE automotive transmissions can be modified to include additional functions provided by the 48RE automotive transmission internally by modifying the existing hydraulic circuitry, discussed as follows.

Modification 1—Modifying the "factory installed" 46RE and 47RE automotive transmissions to include the ability of the 48RE automotive transmission to apply Lockup (TCC) in Manual or Automatic 2nd Gear. *Solenoid command required.

Figure 11:
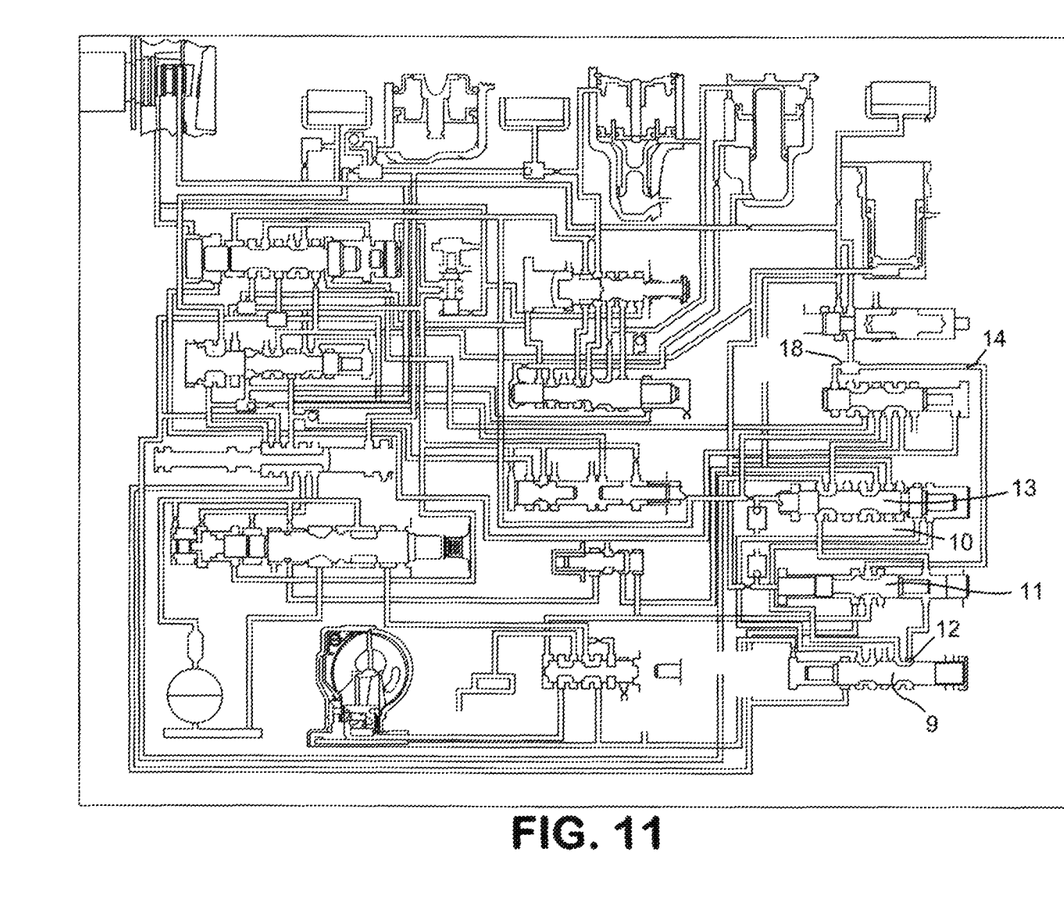
FIGS. 11, 12A, 12B, 12C, 12D, 13, 14, 15A, 15B, and 15C illustrate further improvements to the factory installed transmission in accordance with the present invention.
Figure 12A:
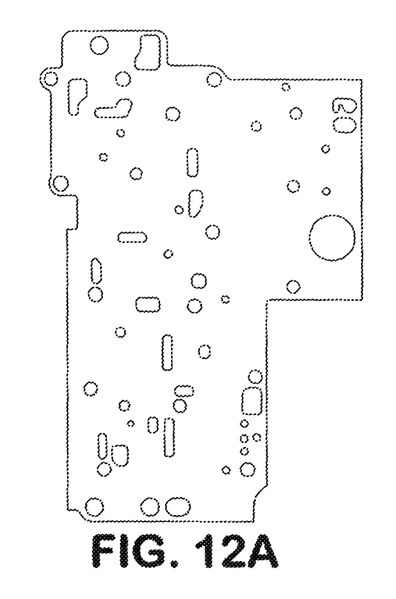
Figure 12B:
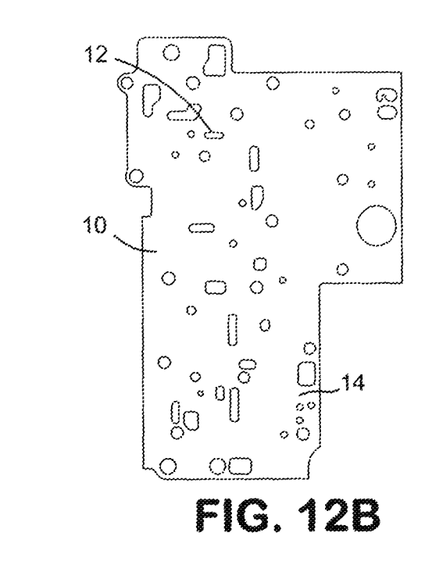
Figure 12C:
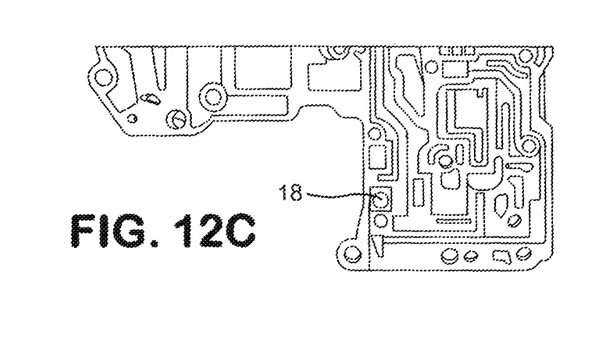
Figure 12D:
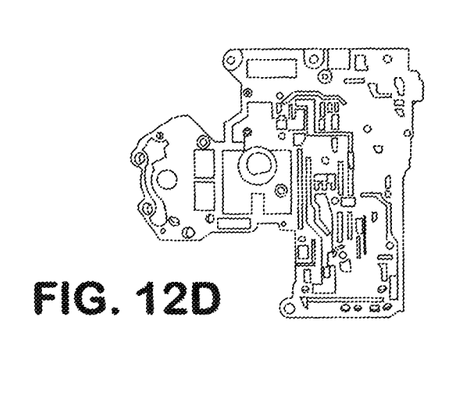
Figure 13:
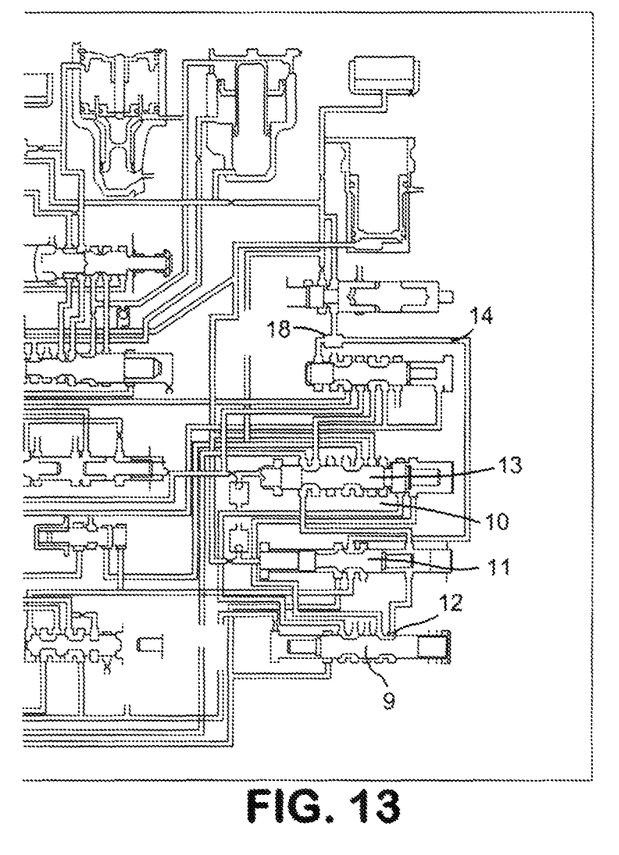

Referring to FIGS. 11-13 of the drawing:
Step 1

Plugging hole "A", as designated by reference numeral 10 (FIGS. 11-13), prevents Manual 2 oil from reaching the outboard end of the lockup valve 11 as well as the 3-4 shift valve 13 thru the newly reversed lockup timing valve 9. Reversing the timing valve removes the lock that prevents a 4-3 down shift from occurring if Lockup is on. This further enhances independent control of TCC and 4th Gear via the solenoids. (Normally TCC (Lockup) must turn off (unlock) before the transmission is capable of down shifting from 4th to 3rd gear).

A new Vent Hole "B", designated by reference numeral 12, (FIGS. 11-13) is provided to prevent pressure from building up in the circuit blocked by the plugged hole "A". The result of these modifications removes the "Lock" on both the Lockup valve and the 3-4 shift valves, thereby allowing the ability to control each valve with solenoid pressure whenever solenoids are fed oil and are energized. (3rd gear oil feeds 3-4 shift valve solenoid, and 2nd gear oil feeds the lockup valve solenoid)
Step 2

Removing the small check ball under the channel casting and plugging hole "C", as designated by reference numeral 14 (FIGS. 11-13), prevents Drive oil fed to the lockup valve from accidentally applying 4th gear when lockup is commanded on by the solenoid.

The resulting functions from the aforementioned modifications to the "factory installed" 46RE and 47RE are:
1) 4th gear shift is now possible if the transmission is in 3rd gear and the 3-4 solenoid is energized, regardless of the TCC operation. 4th gear operation now follows solenoid control whenever solenoid oil (3rd gear oil) is present; and
2) TCC apply is now possible if the TCC solenoid is energized in any automatic Drive Range from 2nd thru 4th gear or in Manual 2nd gear. TCC operation now follows the solenoid control whenever solenoid oil (2nd gear oil) is present.

The Manual 1st gear circuit as modified in accordance with Steps 1 & 2 as discussed above show that the absence of 2nd or 3rd gear oil prevents energized solenoids from accidently applying 4th or TCC in manual or automatic 1st gear.

FIGS. 11-13 of the drawing illustrate how the 46RE and 47RE automotive transmissions hydraulic circuitry is modified by a new lower separator plate to create the new circuits that operate in conjunction with the reversal of the lockup timing valve parts to provide the functional features resulting from Modification 1, as discussed above. As illustrated by FIGS. 11-13, an orifice A (reference numeral 10) of the factory installed separator plate is plugged to block the factory installed circuit shown by reference numeral 10 in FIGS. 11-13; an orifice C (reference numeral 14) of the factory installed separator plate is plugged to block the factory installed circuit shown by reference 14 numeral in FIGS. 11-13; a new vent orifice B (reference numeral 12) is provided in the factory installed separator plate to vent the hydraulic circuit at the position designated by reference numeral 12 in FIGS. 11-13; and check ball is removed from the factory installed transmission at the location in the hydraulic circuitry designated by reference numeral 18 in FIGS. 11-13.

Once the Modification 1 has been made to the factory installed 46RE and 47RE transmissions, further modifications, as discussed below with reference to FIGS. 14 and 15 of the drawing, can be made.

Modification 2—

Modifying the "factory installed" 46RE and 47RE automotive transmissions to include the ability of the 48RE automotive transmission to apply Lockup (TCC) in Manual or Automatic 1st Gear. Solenoid command is required for this further modification.

Step 1

Figure 14:
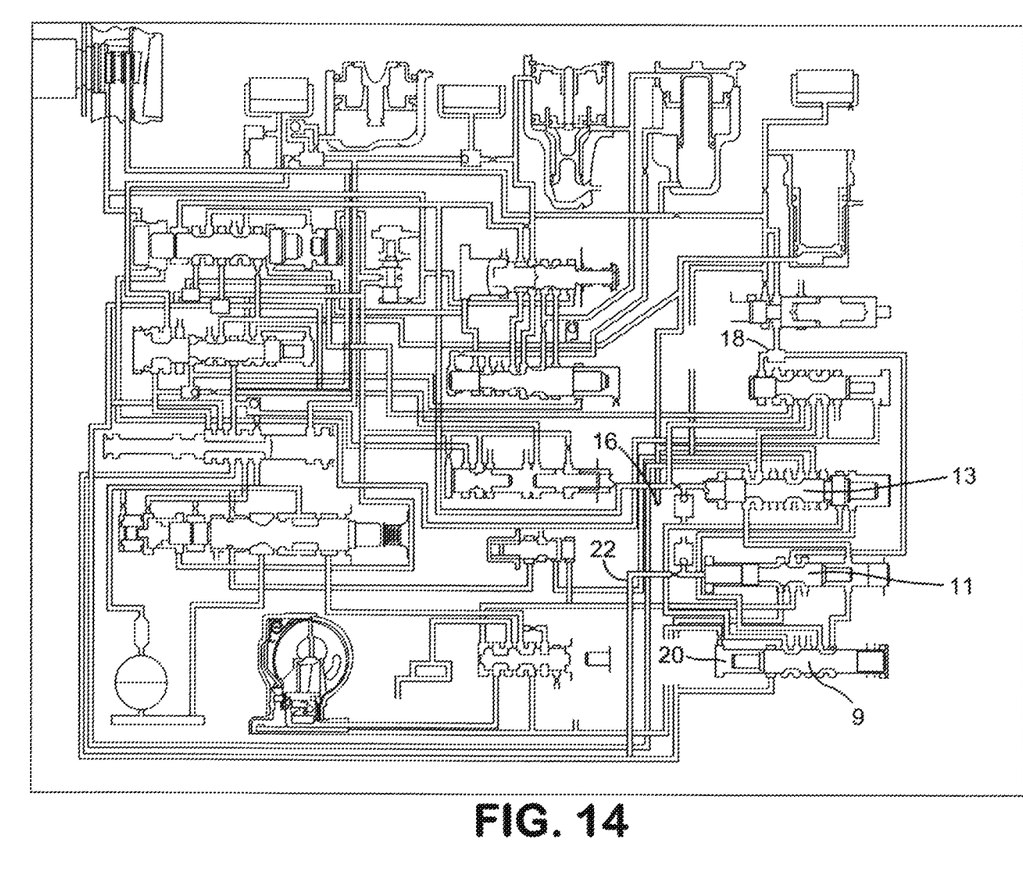
Figure 15A:
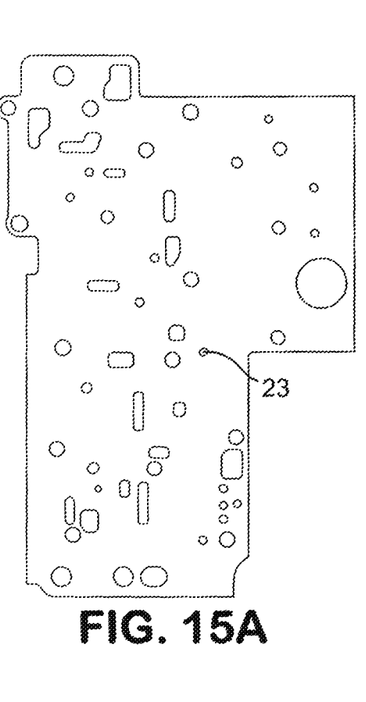

Plugging hole "D" of the factory installed separator plate, as designated by reference numeral 23 in FIG. 15A of the drawing, blocks the original 2nd gear oil circuit feeding the Lockup solenoid as indicated at reference numeral 16 in FIG. 14. The feed circuit is replaced with Drive (forward) oil by a new cross drilled circuit in the lower valve body casting as illustrated by reference numeral 22 in FIGS. 15B and 15C of the drawing. Now any forward range will supply the lockup solenoid with oil and, upon energizing the TCC solenoid, the lockup clutch will engage.

Manual 1st gear circuit with Modification 1 showing the absence of 3rd gear oil still prevents energized solenoid from accidently applying 4th gear. However, with Modification 2, Lockup control is now available in any forward range Drive, first or second gear, and in any forward gear whenever the Lockup solenoid is commanded on.

Figures 15B, 15C:
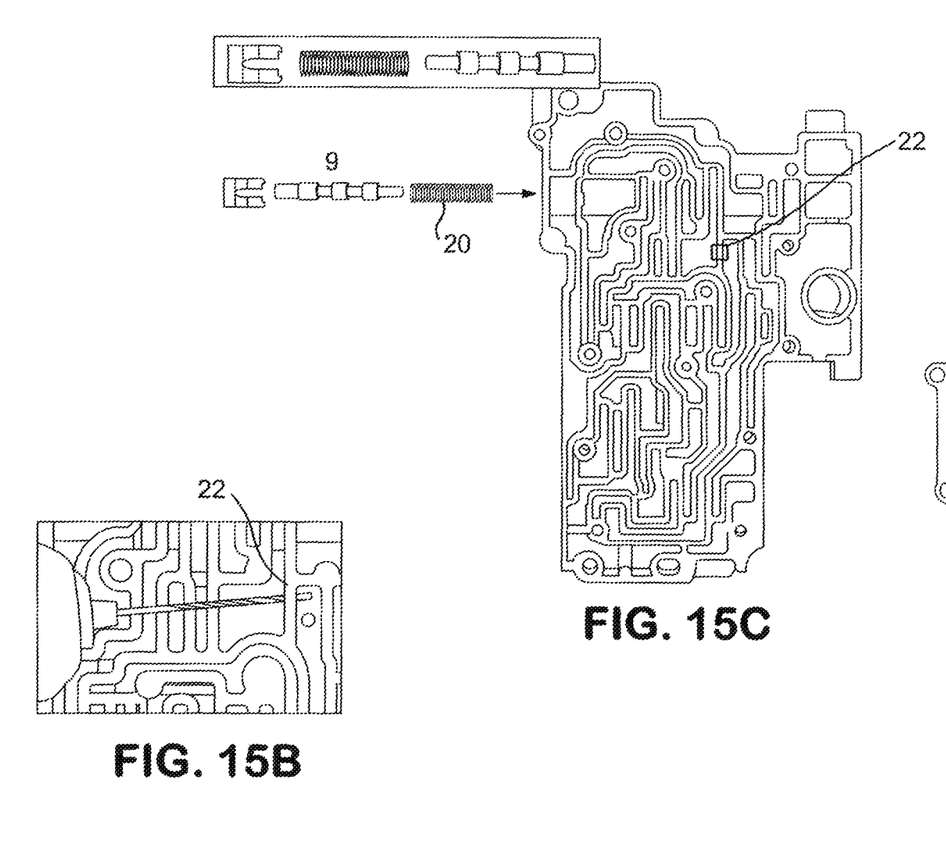

FIGS. 14 and 15 of the drawing further illustrate Modifications 1 and 2, as discussed above, installed into the oil circuit of a "factory installed" 46RE or 47RE automotive transmission.

In FIG. 14, the Lockup Timing Valve (reference numeral 9) is shown in reverse order, and the check ball is removed, as designated by reference numeral 18. A spring 20 is added to exert a force on the lockup timing valve as shown in reversed order on FIG. 14.

The lower factory installed separator plate is modified, as illustrated in FIGS. 14 and 15A, to delete Hole "C"; to delete the Hole "A"; to add a new vent Hole "B"; and to plug the Hole "D" with a rivet (reference numeral 23—FIG. 15A).

With a 0.110 inch drill bit, cross-drill (sideways) thru the side of the partition wall under the X (reference numeral 22 in FIGS. 15B and 15C), at the location in the hydraulic circuitry designated as reference numeral 22 in FIG. 14, and rinse and blow clean any drilling chips out of the body after drilling. This provides the Forward oil to feed the TCC solenoid.

The modifications made herein to 1). improve the operation of factory installed 46RE, 47RE and 48RE automotive transmissions, and 2). to convert factory installed 46RE and 47RE factory installed automotive transmissions into 48RE automotive transmissions, are accomplished exclusively by arrangements of three new cooperating separator plates which internally modify existing hydraulic circuitry of the valve body of the "factory installed" transmissions to internally reroute the flow of hydraulic oil by blocking existing circuits and/or creating new circuits to result in the improved operation and/or conversion of the factory installed 46RE, 47RE, and 48RE automotive transmissions. No external components or structure such as tubes, conduits or fluid passageways, are required to be added to the existing hydraulic circuitry of the factory installed automotive transmissions, thereby resulting in less costs, time and labor to achieve the improvements and/or make the conversion than if external components were installed in the existing hydraulic circuitry.

The invention claimed is:

1. A method for internally modifying the valve body of an automotive transmission, said automotive transmission comprising an original hydraulic circuit for the flow of transmission fluid between a manual valve and a pressure regulator valve, and an original hydraulic circuit for flow of transmission fluid between a boost valve and the pressure regulator valve, the steps of said method including:

blocking the hydraulic circuit between said manual valve and said pressure regulator valve internally within the valve body of said automotive transmission; and forming a new hydraulic circuit internally within the valve body of said automotive transmission for directly supplying hydraulic fluid to the pressure regulator valve and bypassing the manual valve.

2. The method of claim 1, wherein the original hydraulic circuit between the manual valve and the pressure regulator valve provides fluid flow from the manual valve to balance areas at one end of the pressure regulator valve and between a forward and rear end of the pressure regulator valve, the steps of said method further including:

blocking the flow of fluid from the manual valve to both said balance areas of the pressure regulator valve.

3. The method of claim 1, wherein the original hydraulic circuit between the manual valve and the pressure regulator valve provides fluid flow from the manual valve to balance areas at one end of the pressure regulator valve and between a forward and rear end of the pressure regulator valve, the steps of said method further including:

forming said new hydraulic circuit to provide fluid flow directly to the balance area at said one end of the pressure regulator valve.

4. The method of claim 1, wherein the original hydraulic circuit between the manual valve and the pressure regulator valve provides fluid flow from the manual valve to balance areas at both one end of the pressure regulator valve and between a forward and rear end of the pressure regulator valve, the steps of said method further including:

blocking the flow of fluid from the manual valve to both said balance areas of the pressure regulator valve, and forming said new hydraulic circuit to provide fluid flow directly to the balance area at said one end of the pressure regulator valve.

5. The method of claim 1, wherein said new hydraulic formed internally within the valve body is formed by modifying at least one separator plate associated with said valve body.

6. The method of claim 1, wherein said hydraulic circuit between said manual valve and said pressure regulator valve is blocked by modifying at least one separator plate associated with said valve body.

7. The method of claim 5, wherein said at least one separator plate is newly added to said automotive transmission.

8. The method of claim 6, wherein said at least one separator plate is pre-existing in said automotive transmission.

9. A method for internally modifying the valve body of an automotive transmission, said automotive transmission comprising an original hydraulic circuit for the flow of transmission fluid between a manual valve and first and second balance areas of a pressure regulator valve, and an original hydraulic circuit for flow of transmission fluid between a boost valve and the first balance area of the pressure regulator valve, the steps of said method including:
blocking the hydraulic circuit between said manual valve and the second balance area of said pressure regulator valve internally within the valve body; and
forming a new hydraulic circuit internally within said valve body by coupling a first end of said new hydraulic circuit to portion of said original hydraulic circuit between boost valve and the first balance area of the pressure regulator valve, and coupling a second end of said new hydraulic circuit to the second balance area of the pressure regulator valve.

10. The method of claim 9, wherein said first balance area of said pressure regulator valve is a land on said pressure regulator valve between front and rear ends of said pressure regulator valve.

11. The method of claim 9, wherein said second balance area of said pressure regulator valve is an end of said pressure regulator valve.

12. The method of claim 9, wherein said new hydraulic formed internally within the valve body is formed by modifying at least one separator plate associated with said valve body.

13. The method of claim 9, wherein said hydraulic circuit between said manual valve and the second balance area of said pressure regulator valve is blocked by modifying at least one separator plate associated with said valve body.

14. The method of claim 12, wherein said at least one separator plate is newly added to said automotive transmission.

15. The method of claim 13, wherein said at least one separator plate is pre-existing in said automotive transmission.

* * * * *

UNITED STATES PATENT AND TRADEMARK OFFICE
CERTIFICATE OF CORRECTION

PATENT NO. : 10,724,628 B2
APPLICATION NO. : 16/018344
DATED : July 28, 2020
INVENTOR(S) : David A. Hardin Page 1 of 1

It is certified that error appears in the above-identified patent and that said Letters Patent is hereby corrected as shown below:

In the Claims

Claim 4, (Column 8, Line 63): Delete "both".

Claim 5, (Column 9, Line 4): After "hydraulic", add --circuit--.

Claim 9, (Column 10, Line 4): After "between", add --the--.

Claim 12, (Column 10, Line 15): After "hydraulic", add --circuit--.

Signed and Sealed this
Fifteenth Day of September, 2020

Andrei Iancu
*Director of the United States Patent and Trademark Office*